US008245972B2

(12) United States Patent
Capasso et al.

(10) Patent No.: US 8,245,972 B2
(45) Date of Patent: Aug. 21, 2012

(54) LEADING EDGE FOR AIRCRAFT WINGS AND EMPENNAGES

(75) Inventors: Luigi Capasso, San Giorgio a Cremano (IT); Marco Fassero, Leini' (IT); Massimo Riccio, Caserta (IT); Ernesto Rinaldi, Agropoli (IT); Salvatore Russo, Quarto (IT)

(73) Assignee: Alenia Aeronautica S.p.A., Pomigliano D'Arco, Naples (IT)

( * ) Notice: Subject to any disclaimer, the term of this patent is extended or adjusted under 35 U.S.C. 154(b) by 443 days.

(21) Appl. No.: 12/634,402

(22) Filed: Dec. 9, 2009

(65) Prior Publication Data

US 2010/0140405 A1    Jun. 10, 2010

(30) Foreign Application Priority Data

Dec. 9, 2008  (IT) .............................. TO2008A0912

(51) Int. Cl.
*B64C 3/20* (2006.01)
*B32B 3/12* (2006.01)

(52) U.S. Cl. ............. 244/123.13; 244/123.1; 244/123.6; 428/116; 89/36.11

(58) Field of Classification Search ................ 244/35 R, 244/123.1, 123.13, 123.5, 123.6; 428/116; 89/36.11
See application file for complete search history.

(56) References Cited

U.S. PATENT DOCUMENTS

| | | | | |
|---|---|---|---|---|
| 3,097,982 A * | 7/1963 | Stoner ......................... 244/123.6 |
| 3,429,023 A * | 2/1969 | Blythe et al. .............. 244/123.13 |
| 3,490,983 A * | 1/1970 | Lee ................................ 428/116 |
| 4,411,380 A * | 10/1983 | McWithey et al. ...... 244/123.13 |
| 4,542,056 A * | 9/1985 | Anglin et al. .................. 428/116 |
| 4,599,255 A * | 7/1986 | Anglin et al. .................. 244/133 |
| 4,667,905 A * | 5/1987 | Hamm et al. ............ 244/123.13 |
| 4,879,152 A * | 11/1989 | Green .......................... 428/116 |
| 4,892,462 A * | 1/1990 | Barbier et al. ................ 416/226 |
| 4,973,508 A * | 11/1990 | Bretz ............................ 428/116 |
| 4,990,205 A * | 2/1991 | Barbier et al. ................ 416/226 |
| 5,106,668 A * | 4/1992 | Turner et al. ................. 428/116 |
| 5,123,814 A * | 6/1992 | Burdick et al. ............... 416/224 |
| 5,445,861 A * | 8/1995 | Newton et al. ................ 428/116 |
| 5,567,500 A * | 10/1996 | Marshall et al. ............. 428/116 |
| 5,604,010 A * | 2/1997 | Hartz et al. ................... 428/116 |
| 5,685,940 A * | 11/1997 | Hopkins et al. .............. 156/291 |
| 5,730,920 A * | 3/1998 | Marshall et al. ............. 264/214 |

(Continued)

FOREIGN PATENT DOCUMENTS

GB          845138          8/1960

OTHER PUBLICATIONS

European Search Report mailed on Mar. 24, 2010 for corresponding European Application No. 09177579.1.

*Primary Examiner* — Michael Carone
*Assistant Examiner* — Steven Hawk
(74) *Attorney, Agent, or Firm* — Merchant & Gould P.C.

(57) ABSTRACT

A leading edge structure includes two or more multilayer panels at least partially overlapping and suitably curved with at least partially congruent concavities. Each multilayer panel includes at least the following three layers: a first metal foil layer metal foil, a second intermediate layer of fiber-glass securely fixed to the first layer, and a third metal honeycomb layer securely fixed to the second layer.

15 Claims, 2 Drawing Sheets

U.S. PATENT DOCUMENTS

| | | | | |
|---|---|---|---|---|
| 5,981,025 A | * | 11/1999 | Marshall et al. | 428/116 |
| 6,180,206 B1 | * | 1/2001 | Kain, Jr. | 428/116 |
| 6,568,310 B2 | * | 5/2003 | Morgan | 89/36.11 |
| 6,612,217 B1 | * | 9/2003 | Shockey et al. | 89/36.11 |
| 6,951,162 B1 | * | 10/2005 | Shockey et al. | 89/36.11 |
| 7,628,358 B2 | * | 12/2009 | Ackermann et al. | 244/123.13 |
| 7,866,605 B2 | * | 1/2011 | Lee et al. | 244/123.13 |
| 2006/0145009 A1 | * | 7/2006 | Shockey et al. | 89/36.11 |
| 2008/0265095 A1 | * | 10/2008 | Lee et al. | 244/129.1 |
| 2009/0072086 A1 | * | 3/2009 | Smith et al. | 428/116 |

* cited by examiner

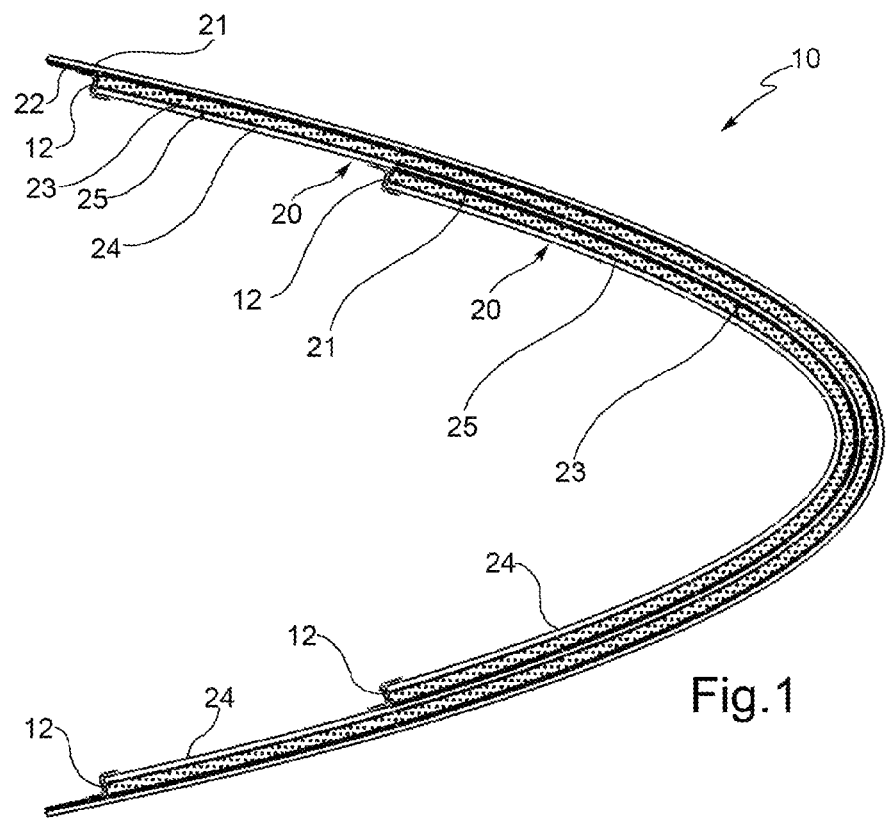
Fig.1
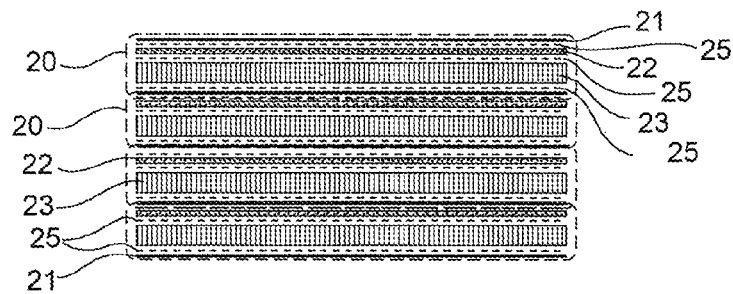
Fig.6
Fig.5
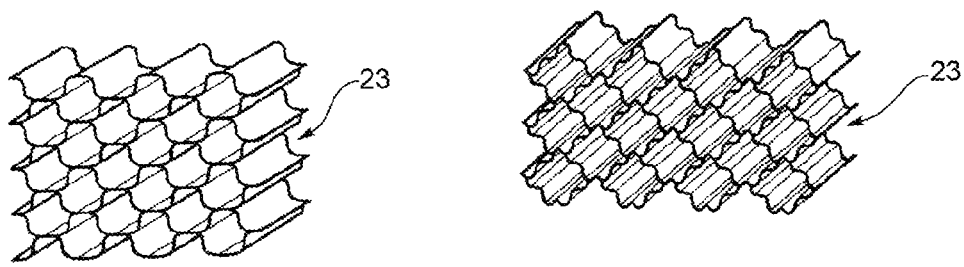
Fig.2

LEADING EDGE FOR AIRCRAFT WINGS AND EMPENNAGES

This application claims benefit of Serial No. TO2008A000912, filed Dec. 9, 2008 in Italy and which application is incorporated herein by reference. To the extent appropriate, a claim of priority is made to the above disclosed application.

BACKGROUND OF THE INVENTION

The present invention relates to a leading edge structure for aircraft wings and empennages.

Wings and empennages (vertical and horizontal) are primary structures sized in a way such as to have a rigidity and robustness suitable for the aerodynamic loads to which it can be subjected during flight, landing and takeoff. The leading edge structure of a wing and of an empennage must also be sized so as to withstand the impact with a flying object.

The so called "bird strike" test is regulated by FAR 25.631 which states that: if an aircraft suffers an impact with a bird, having a defined weight and at a predetermined speed, after such condition there must be no damage on the primary structures that could prevent the aircraft from safely landing at the nearest available airport. Since whilst flying in cruise conditions the first structural element which can potentially undergo such types of impact is the leading edge, this structure must fully comply with the aforementioned standard. In addition to the aforementioned requirement, it is necessary for the leading edge to be suitably sized so as to withstand aerodynamic loads applied to it.

The aforementioned structures are commonly designed and manufactured in a manner such as to prevent the leading edge from being pierced, and thus to avoid possible damage to the structure behind it, or, in the case in which piercing is foreseen, they are designed so that the damage is locally limited.

Conventionally, wing structures are made from aluminium (shell thicknesses generally of only a few millimeters) reinforced by transverse elements which have the main task of giving the profile its shape. In these types of structures the task of absorbing energy is carried out, apart from by the— generally curved—shape of the leading edge, it is especially carried out by its thickness. The greater the thickness, the higher the amount of energy absorbed.

Other wing structures use hybrid material such as Glare® (fibreglass and aluminium laminate) also for the leading edge. In these other structures, the energy is absorbed as well as by the curved shape of the leading edge, particularly by the coupling between fibre-glass and aluminium. Fibre-glass contributes in an important way to absorbing a substantial fraction of the elasto-plastic deformation energy due to impact; this effect is called "bridging" in the field of the materials applied to aircrafts.

SUMMARY OF THE INVENTION

The present invention has the purpose of making an improved structure for the leading edge of a wing or of an empennage, mainly tackling the problem of optimizing the rigidity of the structure, minimizing the damage caused by impact with flying objects and at the same time reducing the overall weight of the wing or of the empennage.

BRIEF DESCRIPTION OF THE DRAWINGS

Now we shall describe some preferred embodiments which should not be taken to limit the invention; we refer to the attached drawings, in which:

FIG. 1 is a schematic cross section view which represents a first embodiment of a leading edge structure according to the invention;

FIG. 2 illustrates a detail of a multi-layered structure given by the overlapping of multilayer panels of the type of FIG. 1, with an enlarged scale;

FIGS. 5 and 6 are perspective views which illustrate two examples of honeycomb layers suitable for being included in the multilayer panels of FIGS. 1-3.

DETAILED DESCRIPTION OF THE PREFERRED EMBODIMENTS

Figure 3:
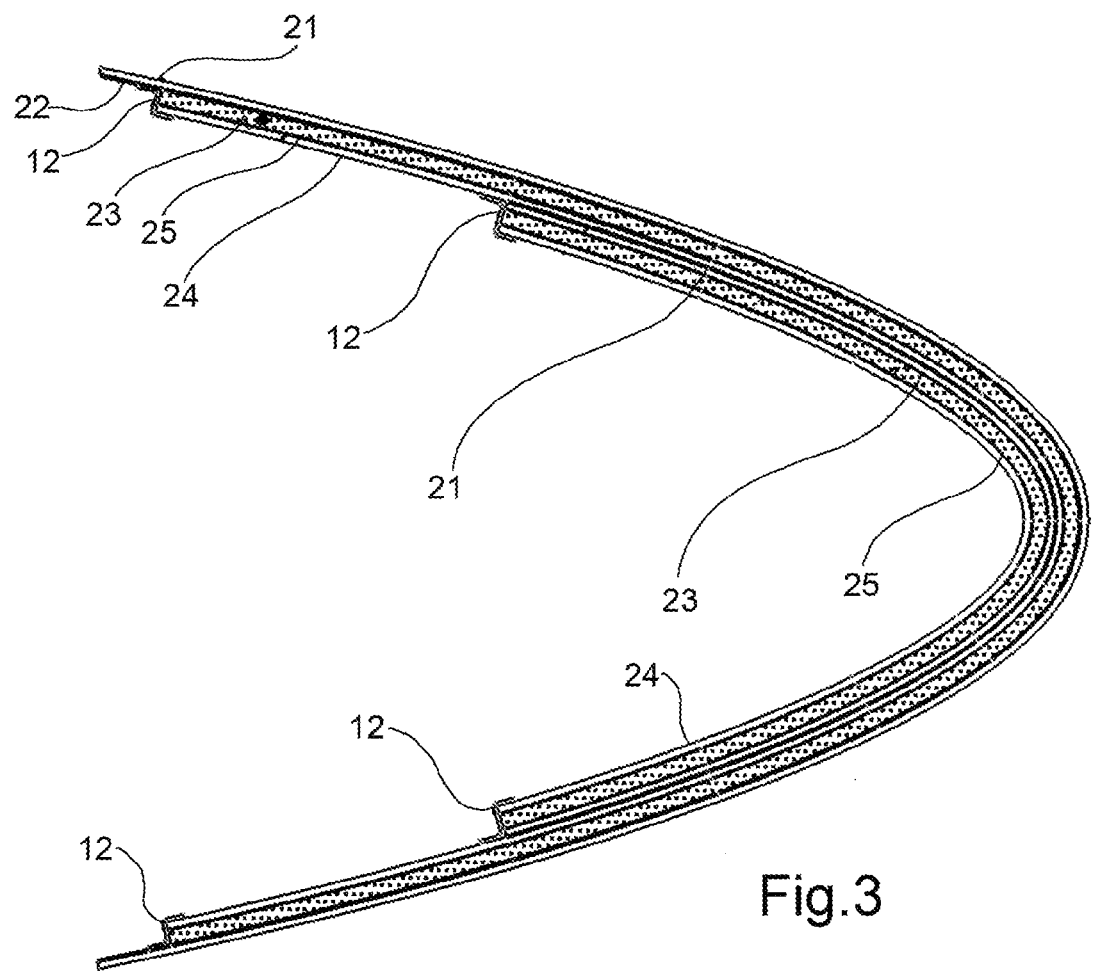
FIG. 3 is a schematic cross section view of a second embodiment of a leading edge structure according to the invention.

Firstly, referring to FIG. 1, a leading edge structure of a wing or of an empennage is wholly indicated with reference numeral 10. In the following description we shall use the terms "front", "outer" and "inner". The term "front" refers to the forward direction of the aircraft, whereas the terms "outer" and "inner" generally refer to a condition in which the leading edge structure is assembled to the rest of the wing or of the empennage, so that the "inner" elements are enclosed in the inner wing or empennage structure.

The leading edge structure 10 constitutes the front portion of a wing profile. The structure 10 is formed by an overlapping of a plurality of multilayer panels 20 suitably curved with concavities facing towards a direction defined as "rear" with respect to the forward direction of an aircraft.

Each multilayer panel has at least the following layers:
- a first outermost metal layer 21, consisting of a foil preferably of aluminium or aluminium alloy, and preferably having a thickness of between 0.2 mm and 0.5 mm;
- a second intermediate layer 22 of fibreglass having a thickness preferably between 0.1 mm and 0.5 mm, but possibly also up to 1 mm;
- a third honeycomb metal layer 23 having a thickness of between about 0.6 cm and about 2.5 cm, comprising walls locally perpendicular to the surface on which the layer lies.

The intermediate layer of fibreglass 22 is connected to the adjacent layers through respective structural adhesive film layers 25. Alternatively, a self-adhesive fibreglass can be chosen.

Figure 4:
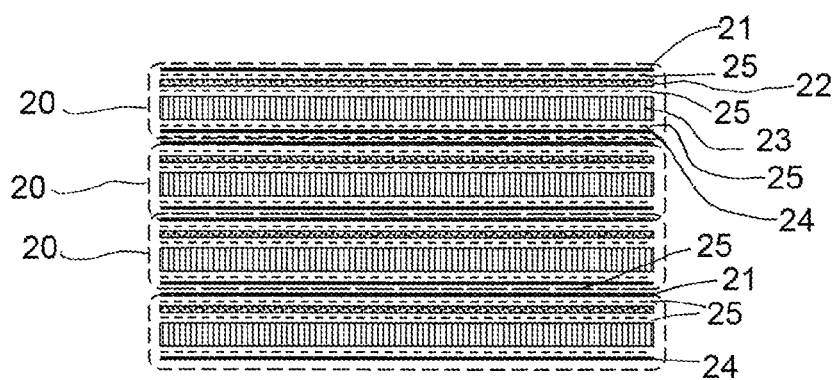
FIG. 4 illustrates a multi-layered structure given by the overlapping of multilayer panels of the type of FIG. 3, with an enlarged scale.

The succession of the layers 21, 22 and 23 forming the modular panel 20 can be repeated many times depending on the design requirements. Indeed, the third honeycomb layer is securely fixed, by means of adhesives, to a subsequent aluminium foil which, in the embodiment illustrated in FIG. 1, constitutes the first outermost layer of a subsequent panel 20 having a convex profile oriented in the same direction as the profile of the outermost panel. In the embodiment of FIGS. 3 and 4, however, each multilayer panel 20 comprises a fourth layer 24 consisting of a last aluminium foil which is fixed to the third layer 23 of the same panel by means of adhesives. The two panels are then fixed to one another through an adhesive 25 applied between the fourth aluminium foil layer 24 of a panel and the first aluminium foil layer of an adjacent panel.

Z-shaped fibreglass closing cross pieces are indicated with reference numeral 12, said cross pieces being suitable for sealing the peripheral edges of the multilayer panels 20. It is preferable to choose multilayer panels of the type having a further aluminium foil 24 for the innermost panels, so as to uninterruptedly cover the honeycomb layers 23 of the panels located in this position.

Men skilled in the art should understand that the number of overlapping curved panels 20, and thus the overall thickness of the leading edge, is variable according to the structural requirements of the wing or of the empennage to be constructed.

The aluminium foils are fundamentally used as elements for fastening the fibreglass layers. The structural characteristics of high mechanical resistance and resilience of fibreglass, intimately and securely fixed together with the metal honeycomb and with the aluminium foil, provide a bridging effect which contributes to absorbing a substantial fraction of the elasto-plastic energy of deformation caused by impact. At the same time, the invention exploits the ability of the metal honeycomb layer for absorbing another large amount of energy caused by impact. Indeed, the honeycomb layer crushes only in the area in which the impact occurs. Therefore, the damage does not propagate to other parts of the wing or of the empennage. The honeycomb layer mainly has a structural function, since it determines the overall rigidity of the leading edge with the advantage of significantly reducing the overall weight of the wing with respect to conventional structures. The honeycomb layers illustrated, as an example, in FIGS. 5 and 6, having slightly undulated walls and available on the market under the names Flex-Core® and Double-Flex®, are ideally meant for following single curvature profiles, double slight curvature profiles (FIG. 6) or double high curvature profiles (FIG. 5).

Experiments carried out by the Applicants have demonstrated that a wing structure constructed according to the present invention allows weight to be saved, having equal overall deformation of the leading edge at the impact zone, of the order of 30% with respect to a structure having comparable rigidity constructed with Glare® technology.

It should be understood that the invention is not limited to the embodiments described and illustrated hereby, said embodiments should be considered example embodiments of the leading edge; the invention can, however, undergo modifications relative to its shape, size, and the arrangement of its constructive details, as defined by the appended claims. For example, the order of the single layers forming the panels can be inverted with respect to what has been illustrated in the present examples, by arranging the first metal foil layer 21 further inside, and the third honeycomb layer (or the fourth metal foil layer 24, if it is foreseen) further outside with respect to the wing or empennage structure. Furthermore, although the foregoing specification refers to aluminum and its alloys for the construction of the metal layers 21, 23 and 24, those skilled in the art will recognize that also other metals (for example titanium) and alloys thereof may be used for implementing the invention in addition to or in replacement of aluminum.

What is claimed is:

1. A leading edge structure for aircraft wings and empennages, wherein at least two or more multilayer panels partially overlap and suitably curve with at least partially congruent concavities, and each multilayer panel comprises at least the following three layers:
   a first layer consisting of a metal foil;
   a second intermediate layer of fibre-glass, fixedly secured to the first layer; and
   a third honeycomb metal layer securely fixed to the second layer.

2. A leading edge structure according to claim 1, wherein at least one of the panels comprises a fourth layer comprising of a further metal foil.

3. A leading edge structure according to claim 1, wherein each panel layers are fixed to one another by adhesives.

4. A leading edge structure according to claim 2, wherein two adjacent and at least partially overlapping panels are fixed to one another by adhesives.

5. A leading edge structure according to claim 4, wherein the third metal honeycomb layer of a given panel is fixed by adhesives to the first metal foil layer of another panel at least partially overlapping said given panel.

6. A leading edge structure according to claim 4, wherein the fourth metal foil layer of a given panel is fixed by adhesive to the first metal foil layer of another panel at least partially overlapping said given panel.

7. A leading edge structure according to claim 1, wherein said metal foil layers are made of aluminium or alloys thereof.

8. A leading edge structure according to claim 1, wherein said metal foil layers have a thickness ranging between about 0.2 mm and about 0.5 mm.

9. A leading edge structure according to claim 1, wherein the second fibreglass layer has a thickness ranging between about 0.1 and about 1 mm.

10. A leading edge structure according to claim 1, wherein the third metal honeycomb layer is made of aluminium or alloys thereof.

11. A leading edge structure according to claim 1, wherein the third honeycomb metal layer has a thickness ranging between about 0.6 cm and about 2.5 cm.

12. A leading edge structure according to claim 1, wherein the third honeycomb metal layer includes walls locally perpendicular to the surface on which that layer lies.

13. A leading edge structure according to claim 12, wherein the walls of the honeycomb layer have an undulating shape.

14. A leading edge structure according to claim 1, wherein in each panel the first layer is the outer-most layer in each panel.

15. A leading edge structure according to claim 1, wherein in each panel the first layer is the innermost layer in each panel.

\* \* \* \* \*